(12) United States Patent
Kobayashi

(10) Patent No.: US 9,369,639 B2
(45) Date of Patent: Jun. 14, 2016

(54) IMAGE PROCESSING APPARATUS, IMAGE PROCESSING METHOD AND STORAGE MEDIUM

(75) Inventor: Tsuyoshi Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 13/641,411

(22) PCT Filed: Apr. 11, 2011

(86) PCT No.: PCT/JP2011/002124
§ 371 (c)(1),
(2), (4) Date: Oct. 15, 2012

(87) PCT Pub. No.: WO2011/132379
PCT Pub. Date: Oct. 27, 2011

(65) Prior Publication Data
US 2013/0039561 A1 Feb. 14, 2013

(30) Foreign Application Priority Data
Apr. 21, 2010 (JP) ................................. 2010-098053

(51) Int. Cl.
*G06K 9/00* (2006.01)
*H04N 5/32* (2006.01)
*H04N 5/361* (2011.01)
*H04N 5/217* (2011.01)

(52) U.S. Cl.
CPC ............... *H04N 5/32* (2013.01); *H04N 5/2178* (2013.01); *H04N 5/361* (2013.01)

(58) Field of Classification Search
CPC ..... H04N 5/361; H04N 5/3658; H04N 5/217; H04N 3/1568; H04N 5/365; A61B 6/585; G01T 1/247
See application file for complete search history.

(56) References Cited

U.S. PATENT DOCUMENTS

| | | | | |
|---|---|---|---|---|
| 7,130,377 B2* | 10/2006 | Matsuno | ................ | A61B 6/585 378/116 |
| 2004/0234114 A1* | 11/2004 | Amakawa | .......... | G01N 21/6452 382/128 |
| 2004/0252874 A1* | 12/2004 | Yamazaki | ................ | H04N 5/32 382/132 |
| 2005/0104981 A1* | 5/2005 | Findlater | .............. | H04N 5/3658 348/241 |
| 2006/0061668 A1* | 3/2006 | Ise | ........................ | H04N 5/3575 348/222.1 |
| 2009/0001276 A1* | 1/2009 | Yagi | ....................... | A61B 6/032 250/370.09 |
| 2009/0140155 A1* | 6/2009 | Yagi | ..................... | H04N 3/1568 250/370.09 |
| 2009/0202129 A1* | 8/2009 | Omi | ........................ | G06K 9/40 382/132 |
| 2009/0290686 A1 | 11/2009 | Liu et al. | | |

(Continued)

FOREIGN PATENT DOCUMENTS

CN 101350886 A 1/2009
CN 101683269 A 3/2010

(Continued)

*Primary Examiner* — Avinash Yentrapati
(74) *Attorney, Agent, or Firm* — Canon USA Inc., IP Division

(57) ABSTRACT

In the present invention, an image capturing condition measurement unit measures image capturing conditions used when an object image is captured based on radiation that has passed through an object and calculates an added value based on the image capturing conditions. An X-ray signal reading unit generates image data containing the object image based on the radiation that has passed through the object. An offset correction unit performs an offset correction of the image data with using correction image data containing a dark current component and then performs an offset correction of the image data with using the added value.

11 Claims, 3 Drawing Sheets

(56) References Cited

U.S. PATENT DOCUMENTS

| | | | |
|---|---|---|---|
| 2010/0020933 A1* | 1/2010 | Topfer | G06T 5/50 378/98.11 |
| 2010/0034356 A1* | 2/2010 | Hayashida | H04L 67/12 378/98 |
| 2010/0245378 A1* | 9/2010 | Matsuura | A61B 6/583 345/589 |
| 2012/0020541 A1* | 1/2012 | Hayashida | A61B 6/583 382/132 |
| 2013/0182934 A1* | 7/2013 | Topfer | G06K 9/38 382/132 |
| 2014/0111674 A1* | 4/2014 | Iwasaki | H04N 5/361 348/294 |

FOREIGN PATENT DOCUMENTS

| | | |
|---|---|---|
| EP | 1477932 A2 | 11/2004 |
| EP | 2148500 A1 | 1/2010 |
| JP | 7236093 A | 9/1995 |
| JP | H07-236093 A | 9/1995 |
| JP | 9168536 A | 6/1997 |
| JP | 2003116064 A | 4/2003 |
| JP | 2007-243637 A | 9/2007 |
| JP | 2010-012082 A | 1/2010 |

* cited by examiner

IMAGE PROCESSING APPARATUS, IMAGE
PROCESSING METHOD AND STORAGE
MEDIUM

TECHNICAL FIELD

The present invention relates to a technique for offset correction processing to remove a dark current component from captured image data.

BACKGROUND ART

With the progress of digital technology in recent years, digitalization of an image obtained from medical X-ray imaging has been increasingly becoming a common practice. In place of X-ray imaging using a film for X-ray diagnosis that has widely been used, X-ray image capturing apparatuses using a planar detector in which conversion elements that convert an X-ray into an electric signal are two-dimensionally placed are beginning to be used. To provide data that is valuable for diagnosis from digital data (hereinafter, referred to as X-ray image data) obtained from such an X-ray image capturing apparatus, it is vitally important to connect an image processing apparatus to a subsequent stage to perform processing such as corrections of detector characteristics, logarithmic conversions, and gradient conversion on the data.

An X-ray image capturing apparatus has a characteristic that charges due to a dark current are accumulated even when image is captured without using X-ray. Thus, in addition to a charge component of an object signal derived from X-rays that have passed through an object, a charge component derived from a dark current is added to X-ray image data not yet processed by the image processing apparatus. The dark current component could cause artifacts in the image data. To reduce the influence of the dark current component, offset correction processing is performed in which an image is captured without using X-ray and the obtained offset correction image data containing the obtained dark current component is subtracted from the unprocessed X-ray image data.

However, it is known that the dark current component fluctuates depending on an operating temperature of the X-ray image capturing apparatus or time in which charges are accumulated when an image is captured and thus, it is difficult to completely remove the dark current component by the offset correction processing. Particularly under image capturing conditions in which temporal fluctuation of the dark current component increases such as image-capturing of long-time accumulation at high temperature, a region where a pixel value is zero or less may be included in measured data as a result of performing offset correction processing for a region of a low signal in image data. Since it is necessary to replace a region containing the pixel value of zero or less by a suitable positive value when a logarithmic conversion is performed in a subsequent stage by the image processing apparatus, the image signal in the region is lost, so that an artifact in a shape of the region containing the pixel value of zero or less is generated.

Under such circumstances, a technique for suppressing an artifact caused due to a loss of an image signal by removing values of zero or less by performing image processing after adding a bias value determined from the minimum value of X-ray image data on which offset correction processing has been performed to the whole image is known (for example, see Japanese Patent Application Laid-Open No. 9-168536).

However, the above conventional technique simply adds a bias value determined from the minimum value of X-ray image data on which offset correction processing has been performed to the whole image. Thus, a pixel having a value of zero or less while containing image information and a pixel (noise component) having an unexpectedly low value cannot be distinguished. Therefore, if an unexpectedly low value is added to the whole image as a bias value, a signal originally represented by a small pixel value becomes an unnecessarily large value, causing an issue of the dynamic range being significantly damaged.

CITATION LIST

Patent Literature

PTL 1: Japanese Patent Application Laid-Open No. H9-168536

SUMMARY OF INVENTION

The present invention has been made in consideration of the above situation, and has as its object to reduce degradation in a dynamic range which is caused when offset correction processing is performed.

According to the present invention, the foregoing object is attained by providing an image processing apparatus including a measurement unit configured to measure image capturing conditions used when an object image is captured based on radiation that has passed through an object, a calculation unit configured to calculate an added value based on the image capturing conditions measured by the measurement unit, a generation unit configured to generate image data containing the object image based on the radiation that has passed through the object, a first offset correction unit configured to perform an offset correction of the image data with using correction image data containing a dark current component, and a second offset correction unit configured to perform the offset correction of the image data which is offset-corrected by the first offset correction unit with using the added value calculated by the calculation unit.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

In the description of each exemplary embodiment of the present invention below, a case where an X-ray image capturing apparatus that captures X-ray image data of an object using an X ray, which is a kind of radiation, is applied as a radiation imaging apparatus according to the present invention will be described. The present invention is not limited to the X-ray image capturing apparatus and can be applied to a radiation image capturing apparatus that captures a radiographic image of an object using other radiation (for example, an alpha ray, a beta ray, and a gamma ray).

Figure 1:
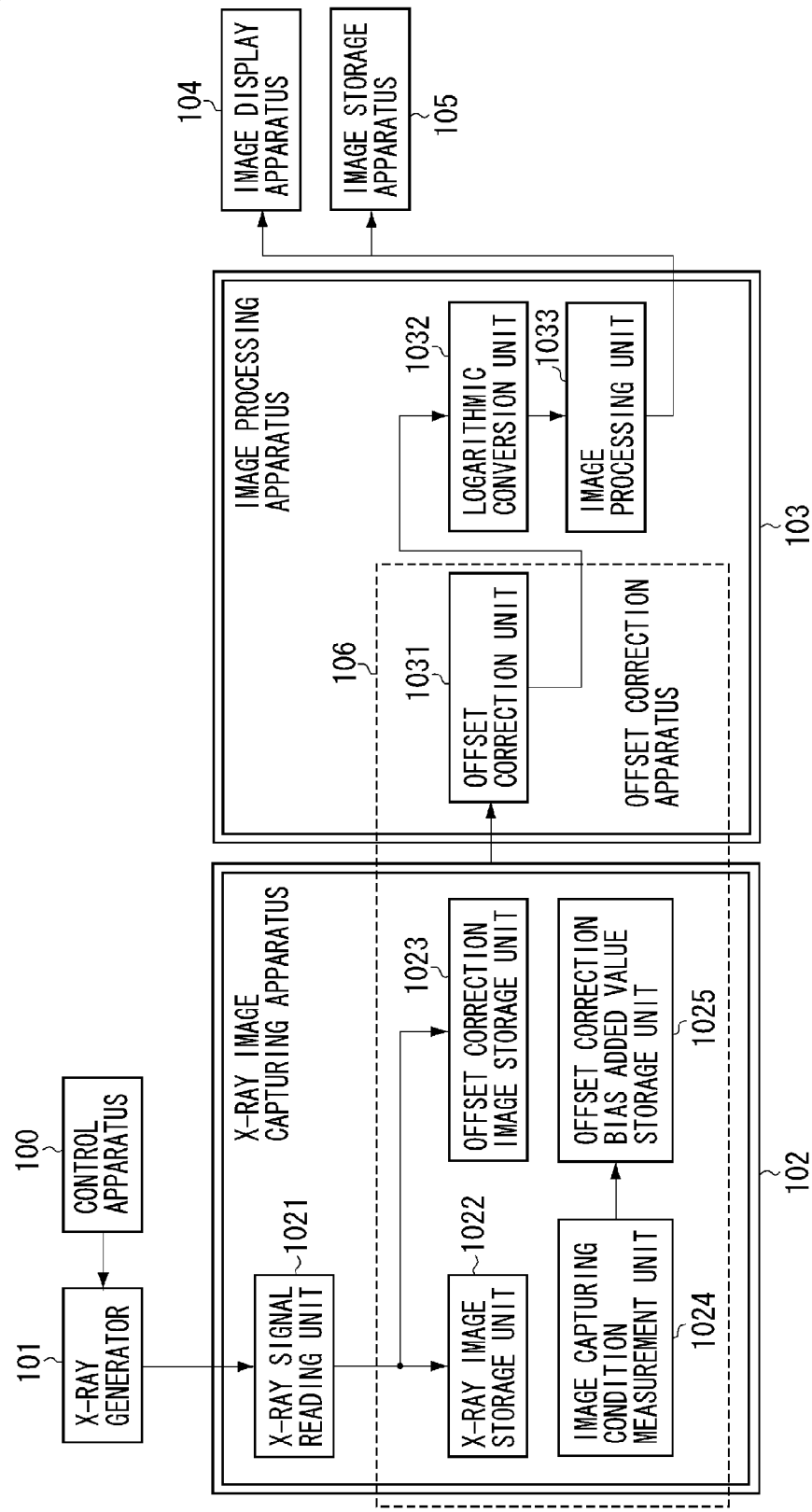
FIG. 1 is a block diagram illustrating an outline configuration of an X-ray image processing system according to a first exemplary embodiment.

A first exemplary embodiment of the present invention will be described below. FIG. 1 is a block diagram illustrating an outline configuration of an X-ray image processing system according to the first exemplary embodiment of the present invention. As illustrated in FIG. 1, an X-ray image processing system according to the present exemplary embodiment includes a control apparatus 100, an X-ray generator 101, an X-ray image capturing apparatus 102, an image processing apparatus 103, an image display apparatus 104, and an image storage apparatus 105.

The control apparatus 100 is connected to the X-ray generator 101 to control the X-ray generator 101. The X-ray generator 101 irradiates an object with X-rays, and X-rays that have passed through the object enter the X-ray image capturing apparatus 102. The X-ray image capturing apparatus 102 captures an object image by the incident X-rays to generate X-ray image data.

The image processing apparatus 103 is connected to the X-ray image capturing apparatus 102 to perform image processing on the X-ray image data output from the X-ray image capturing apparatus 102. The image display apparatus 104 is connected to the image processing apparatus 103 to display X-ray image data on which the image processing has been performed and which is output from the image processing apparatus 103. The image storage apparatus 105 is connected to the image processing apparatus 103 to store the X-ray image data on which the image processing has been performed and which is output from the image processing apparatus 103.

The X-ray image capturing apparatus 102 includes an X-ray signal reading unit 1021, an X-ray image storage unit 1022, an offset correction image storage unit 1023, an image capturing condition measurement unit 1024, and an offset correction bias added value storage unit 1025. The image processing apparatus 103 includes an offset correction unit 1031, a logarithmic conversion unit 1032, and an image processing unit 1033.

The X-ray generator 101 generates an X-ray when an operator operates the control apparatus 100. The X-ray is irradiated on the X-ray signal reading unit 1021 after passing through the object, thus X-ray image data is generated. The X-ray signal reading unit 1021 reads the X-ray image data and stores it in the X-ray image storage unit 1022.

The X-ray signal reading unit 1021 also generates offset correction image data to correct a dark current component and stores the offset correction image data in the offset correction image storage unit 1023. Regarding a method for generating offset correction image data, any publicly known method for generating offset correction image data in the technique to correct a dark current may be applied to the present invention.

The image capturing condition measurement unit 1024 acquires image capturing conditions when capturing of X-ray image data is started by the X-ray signal reading unit 1021 to determine an offset correction bias added value. The determined offset correction bias added value is stored in the offset correction bias added value storage unit 1025.

Information pieces stored in the X-ray image storage unit 1022, the offset correction image storage unit 1023, and the offset correction bias added value storage unit 1025 are transferred to the image processing apparatus 103 and used by the offset correction unit 1031 for offset correction processing.

In the description below, the X-ray image storage unit 1022, the offset correction image storage unit 1023, the image capturing condition measurement unit 1024, the offset correction bias added value storage unit 1025, and the offset correction unit 1031 may together be referred to as an offset correction apparatus 106. The X-ray image capturing apparatus 102 and the image processing apparatus 103 have configurations to be application examples of an image processing apparatus according to the present invention.

The image capturing condition measurement unit 1024 has a configuration to be application examples of a measurement unit and a calculation unit in the image processing apparatus according to the present invention. The X-ray signal reading unit 1021 has a configuration to be an application example of a generation unit in the image processing apparatus according to the present invention. The offset correction unit 1031 has a configuration to be application examples of a first offset correction unit and a second offset correction unit in the image processing apparatus according to the present invention. The logarithmic conversion unit 1032 has a configuration to be an application example of a logarithmic conversion unit in the image processing apparatus according to the present invention.

Image data whose offset correction is completed is logarithmically converted by the logarithmic conversion unit 1032 in a subsequent stage. If the X-ray image data before logarithmic conversion contains the value of zero or less, the logarithmic conversion unit 1032 performs the logarithmic conversion after replacement by a suitable positive value (for example, 1). Predetermined image processing is performed on the X-ray image data after the logarithmic conversion by the image processing unit 1033. The X-ray image data on which the image processing has been performed by the image processing unit 1033 is displayed by the image display apparatus 104 and also stored in the image storage apparatus 105.

Figure 2:
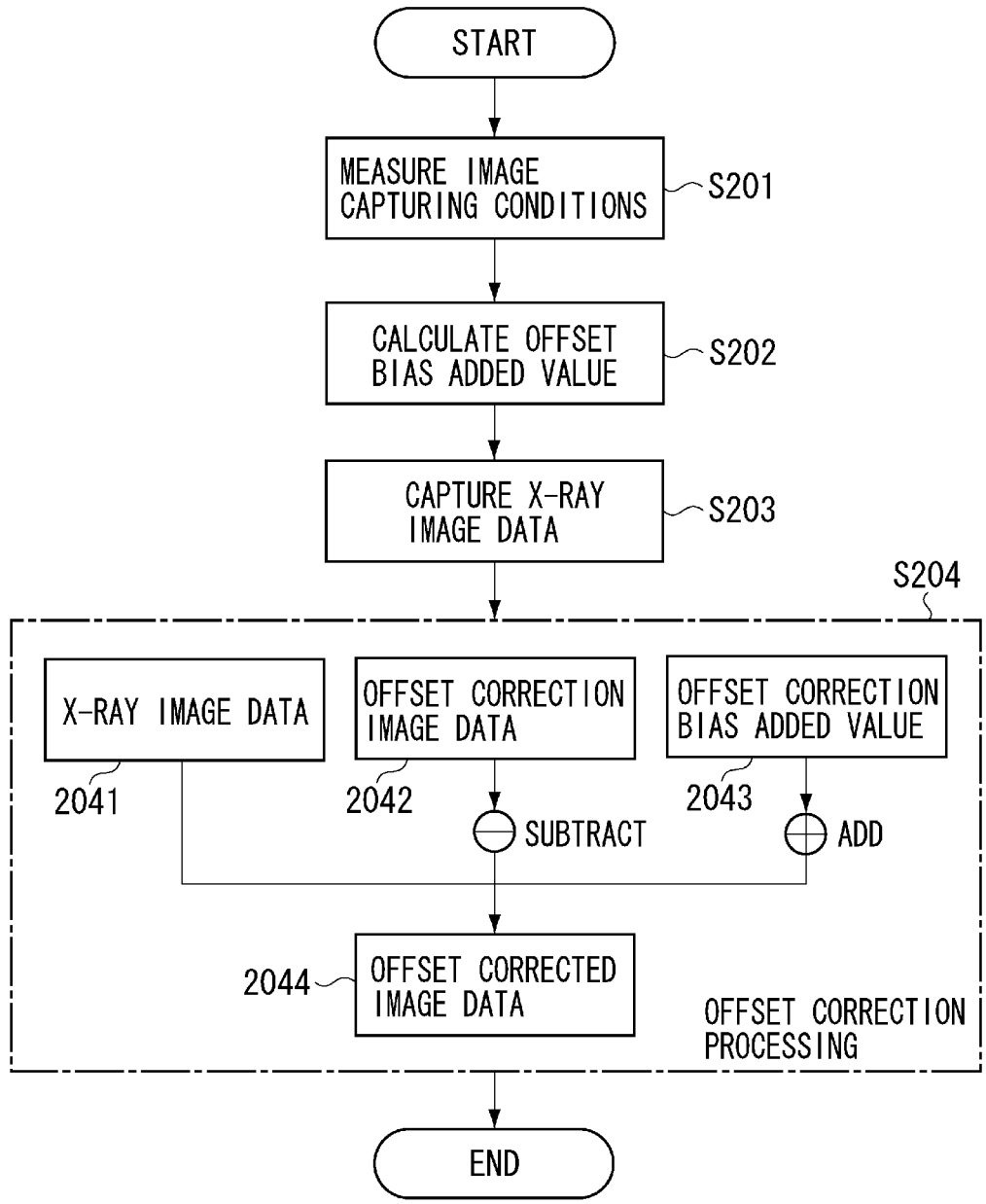
FIG. 2 illustrates a flow of processing of an offset correction apparatus according to the first exemplary embodiment.

FIG. 2 illustrates the flow of processing by the offset correction apparatus 106 when capturing of the X-ray image data is started by the X-ray image capturing apparatus 102. In the first exemplary embodiment, whether to perform offset correction using the offset correction bias added value is determined before capturing of the X-ray image data. The operation of the offset correction apparatus 106 according to the present exemplary embodiment will be described in detail with reference to FIG. 2.

When a capturing operation is performed by an operator, in step S201, the image capturing condition measurement unit 1024 measures image capturing conditions. Image capturing conditions refer to at least any one of a radiation dose of X-rays during image capturing, an operating temperature and humidity of the operating environment of the X-ray image capturing apparatus 102 during image capturing, a frame rate of image data generated by the X-ray signal reading unit 1021, whether offset processing using an offset correction bias added value is performed, a region for reading charges from the X-ray signal reading unit 1021, accumulation time of charges, time from the start to the end of the image capturing operation, a image capturing history, a system noise or sensitivity of the X-ray image capturing apparatus 102. Any publicly known method may be used to measure image capturing conditions. For example, a memory to store information about a driving method may be prepared or a temperature sensor to measure the temperature may be included.

In step S202, the image capturing condition measurement unit 1024 calculates the offset correction bias added value based on the image capturing conditions acquired in step S201. The offset correction processing is processing to subtract offset correction image data containing a dark current component obtained by image capturing without using X-ray from the X-ray image data.

If the image capturing conditions are such that temporal fluctuation of the dark current value of the X-ray image capturing apparatus 102 increases and the pixel value of zero or less occurs when the above offset correction processing is performed, the image capturing condition measurement unit 1024 sets the offset correction bias added value to a suitable value greater than zero.

On the other hand, if image capturing conditions are such that temporal fluctuation of the dark current value of the X-ray image capturing apparatus 102 are small and the pixel value of zero or less does not occur if the above offset correction processing is performed, the image capturing condition measurement unit 1024 sets the offset correction bias added value to zero.

The image capturing condition measurement unit 1024 calculates the offset correction bias added value from parameters of the image capturing conditions. The method shown below is known as a method for calculating the offset correction bias added value from parameters of the image capturing conditions. For example, the image capturing condition measurement unit 1024 may estimate a relational equation using the temperature and driving time as variables from the system noise, sensitivity, and the driving method of the X-ray image capturing apparatus 102, and calculate the offset correction bias added value by using the relational equation.

Alternatively, optimum offset correction bias added values may be measured under some image capturing conditions in advance to prepare a table in which the image capturing conditions and the offset correction bias added value are associated with each other. Then, the image capturing condition measurement unit 1024 may select data closest to the image capturing conditions to determine the offset correction bias added value after weighting.

In step S203, the X-ray signal reading unit 1021 generates the X-ray image data by image capturing. In step S204, the offset correction apparatus 106 performs offset correction processing. Details of the offset correction processing in step S204 will be described below.

The offset correction unit 1031 acquires X-ray image data 2041 from the X-ray image storage unit 1022. The offset correction unit 1031 also acquires offset correction image data 2042 from the offset correction image storage unit 1023. The offset correction unit 1031 also acquires an offset correction bias added value 2043 from the offset correction bias added value storage unit 1025.

Then, the offset correction unit 1031 subtracts the offset correction image data 2042 from the X-ray image data 2041 and adds the offset correction bias added value 2043 thereto. Accordingly, offset corrected image data 2044 is generated. If zero is determined as the offset correction bias added value by the image capturing condition measurement unit 1024, the offset correction bias added value 2043 is not added.

By adding the offset correction bias added value calculated from the image capturing conditions to the X-ray image data, as described above, a pixel having a value of zero or less while containing image information and a pixel (noise component) having an unexpectedly low value can be distinguished. Therefore, according to the present exemplary embodiment, since no extra pixel addition is performed, X-ray image data valuable for diagnosis can be provided without causing significant degradation in the dynamic range.

Next, a second exemplary embodiment of the present invention will be described. While an X-ray image processing system according to the second exemplary embodiment of the present invention has a configuration similar to the configuration of the X-ray image processing system according to the first exemplary embodiment illustrated in FIG. 1, processing of the offset correction apparatus 106 is different from the processing of the offset correction apparatus 106 in the first exemplary embodiment.

Figure 3:
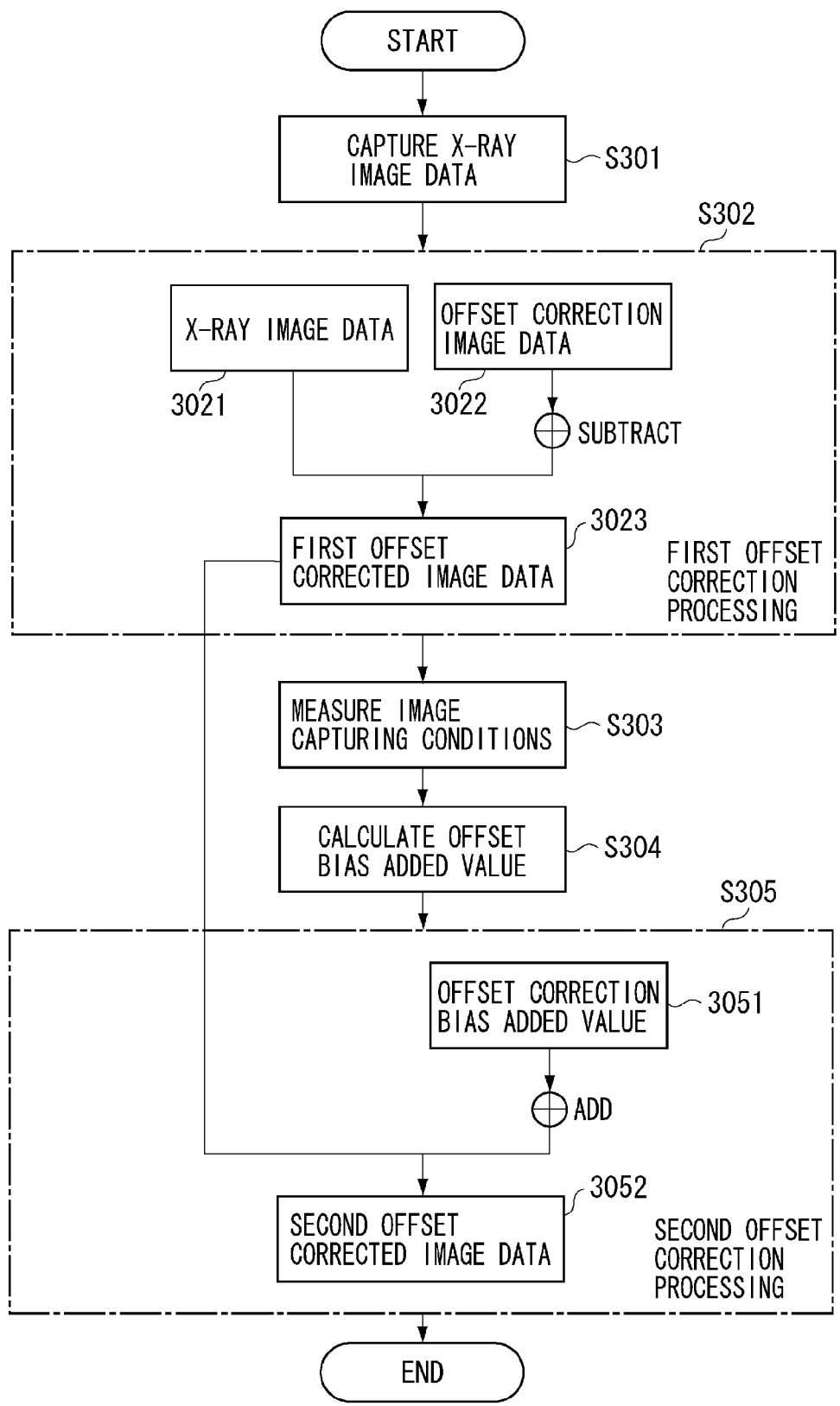
FIG. 3 illustrates a flow of processing of an offset correction apparatus according to a second exemplary embodiment.

FIG. 3 illustrates the flow of processing of the offset correction apparatus 106 in the second exemplary embodiment of the present invention. In the second exemplary embodiment, whether to perform the offset correction using the offset correction bias added value is determined after capturing of the X-ray image data. The operation of the offset correction apparatus 106 according to the second exemplary embodiment will be described in detail with reference to FIG. 3.

When an image capturing operation is performed by an operator, in step S301, the X-ray image data is captured by the X-ray signal reading unit 1021. In step S302, the offset correction apparatus 106 performs first offset correction processing.

In the first offset correction processing, the offset correction unit 1031 acquires X-ray image data 3021 from the X-ray image storage unit 1022 and offset correction image data 3022 from the offset correction image storage unit 1023. Then, the offset correction unit 1031 subtracts the offset correction image data 3022 from the X-ray image data 3021. Accordingly, first offset corrected image data 3023 is generated.

In step S303, the image capturing condition measurement unit 1024 measures the image capturing conditions. The image capturing conditions measured here are similar to the image capturing conditions measured in the first exemplary embodiment. The difference from the first exemplary embodiment is that the first offset corrected image data 3023 is calculated before measurement of the image capturing conditions in step S303 and thus, the first offset corrected image data 3023 is added to the image capturing conditions.

In step S304, the image capturing condition measurement unit 1024 calculates an offset correction bias added value 3051 used for second offset correction processing (step S305) from the image capturing conditions measured in step S303.

In addition to the method described in the first exemplary embodiment, the offset correction bias added value 3051 can be calculated as follows. For example, the offset correction bias added value 3051 calculated temporarily and an absolute value of the minimum pixel value in the first offset corrected image data 3023 may be compared. If the temporarily calculated offset correction bias added value 3051 exceeds the absolute value of the minimum pixel value in the first offset corrected image data 3023, the offset correction bias added value 3051 may be set to zero. Accordingly, pixels exceeding the minimum pixel value due to a measurement error can be prevented from being added.

In step S305, the offset correction apparatus 106 performs the second offset correction processing. More specifically, the offset correction unit 1031 adds the offset correction bias added value 3051 to the first offset corrected image data 3023. Accordingly, second offset corrected image data 3052 is generated.

In the second exemplary embodiment, whether to perform the second offset correction processing, that is, whether to perform offset correction processing using the offset correction bias added value is determined after the first offset correction processing. Therefore, according to the present exemplary embodiment, even if the calculation of the offset correction bias added value fails, it is possible to ensure that the dynamic range is not lower than that when the bias value is determined simply from the minimum pixel value of the first offset corrected image data. Further in the present exemplary embodiment, like in the first exemplary embodiment, an effect which can provide X-ray image data valuable for diagnosis without causing significant degradation in the dynamic range is obtained.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-098053, filed Apr. 21, 2010, which is hereby incorporated by reference herein in its entirety.

The invention claimed is:

1. An image processing apparatus comprising:
a measurement unit configured to measure image capturing conditions based on a frame rate that are used when an object image is captured based on radiation that has passed through an object;
a generation unit configured to generate image data containing the object image based on the radiation that has passed through the object;
a first offset correction unit configured to perform an offset correction of the image data by subtracting correction image data containing a dark current component from the image data;
a calculation unit configured to calculate an added value that is based on temporal fluctuation of a dark current value based on the image capturing conditions measured by the measurement unit; and
a second offset correction unit configured to add the added value calculated by the calculation unit to the image data, including a pixel value of zero or less, which is offset-corrected by the first offset correction unit,
wherein the calculation unit calculates the added value so that the image data offset-corrected by the first offset correction unit does not include the pixel value of zero or less.

2. The image processing apparatus according to claim 1, wherein the image capturing conditions include at least one of a dose of a radiation during image capturing, an operating temperature of a radiation imaging apparatus including the generation unit during image capturing, humidity of an operating environment of the radiation imaging apparatus, a frame rate of the image data generated by the generation unit, whether to perform an offset correction using the added value, a reading region of charges from the generation unit configured to generates the image data, accumulation time of charges in the generation unit, time from a start of an image capturing operation to an end of the image capturing operation, an image capturing history, system noise of the radiation imaging apparatus, and sensitivity of the radiation imaging apparatus.

3. The image processing apparatus according to claim 2, wherein the image capturing conditions further include the image data corrected by the first offset correction unit.

4. The image processing apparatus according to claim 1, wherein the second offset correction unit determines whether to perform the offset correction using the added value according to the image capturing conditions including the frame rate.

5. The image processing apparatus according to claim 1, further comprising a logarithmic conversion unit configured to perform a logarithmic conversion in a subsequent stage of the second offset correction unit.

6. An image processing apparatus comprising:
a radiographic image acquisition unit configured to acquire a radiographic image of an object based on radiation that has passed through the object;
an image capturing condition acquisition unit configured to acquire image capturing conditions including frame rate information of image data read when the radiographic image is acquired;
a noise acquisition unit configured to acquire a pixel value of zero or less as a noise component of the radiographic image based on the measured image capturing conditions; and
an offset correction unit configured to add an added value to the radiographic image, the added value being based on temporal fluctuation of a dark current value which based on the acquired noise component,
wherein the offset correction unit adds the added value so that the radiographic image does not include the pixel value of zero or less when the offset correction is performed by the offset correction unit.

7. A method executed by an image processing apparatus, the method comprising:
measuring image capturing conditions based on a frame rate that are used when an object image is captured based on radiation that has passed through an object;
generating image data containing the object image based on the radiation that has passed through the object;
performing first offset correction of the image data by subtracting correction image data containing a dark current component from the image data;
calculating an added value that is based on temporal fluctuation of a dark current value based on the measured image capturing conditions; and
performing second offset correction by adding the added value to the image data, including a pixel value of zero or less, which is offset-corrected by the first offset correction,
wherein the added value is calculated so that the image data offset-corrected by performing the first offset correction does not include the pixel value of zero or less.

8. A non-transitory computer-readable storage medium that stores a program for causing a computer to perform image processing, the program comprising computer-executable instructions for:
measuring image capturing conditions based on a frame rate that are used when an object image is captured based on radiation that has passed through an object;
generating image data containing the object image based on the radiation that has passed through the object;
performing a first offset correction of the image data by subtracting correction image data containing a dark current component from the image data;
calculating an added value that is based on temporal fluctuation of a dark current value based on the measured image capturing conditions; and performing a second offset correction by adding the added value to the image data, including a pixel value of zero or less, which is offset-corrected by the first offset correction, wherein the added value is calculated so that the image data offset-corrected by the first offset correction does not include the pixel value of zero or less.

9. An image processing apparatus comprising:

a measurement unit configured to measure image capturing conditions including system noise and sensitivity of an image capturing unit used when an object image is captured based on radiation that has passed through an object;

a calculation unit configured to calculate an added value indicating temporal fluctuation of a dark current value based on the image capturing conditions measured by the measurement unit;

a generation unit configured to generate image data containing the object image based on the radiation that has passed through the object;

a first offset correction unit configured to perform an offset correction of the image data by subtracting correction image data containing a dark current component from the image data; and a second offset correction unit configured to add the added value calculated by the calculation unit to the image data which is offset-corrected by the first offset correction unit, wherein the calculation unit is configured to calculate the added value using a relational equation based on a temperature and a time as variables corresponding the system noise and sensitivity of the image capturing unit.

10. The image processing apparatus according to claim 1, wherein the image capturing conditions are conditions where temporal fluctuation of the dark current value increases.

11. The image processing apparatus according to claim 1, further comprising a table in which several image capturing conditions and added values are stored associated with each other, wherein the calculation unit calculates an added value associated with an image capturing condition from the table.

* * * * *